Figure 3:
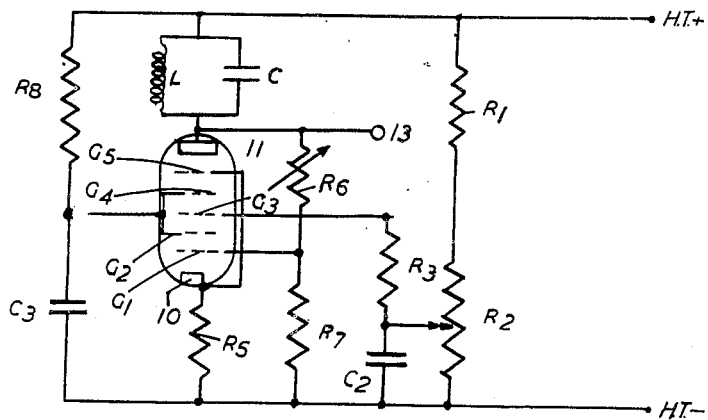

Sept. 12, 1950 T. E. IVALL 2,521,726
ELECTRICAL CIRCUITS FOR THE GENERATION
OF PULSES OR OSCILLATIONS
Filed Oct. 17, 1944 2 Sheets-Sheet 1
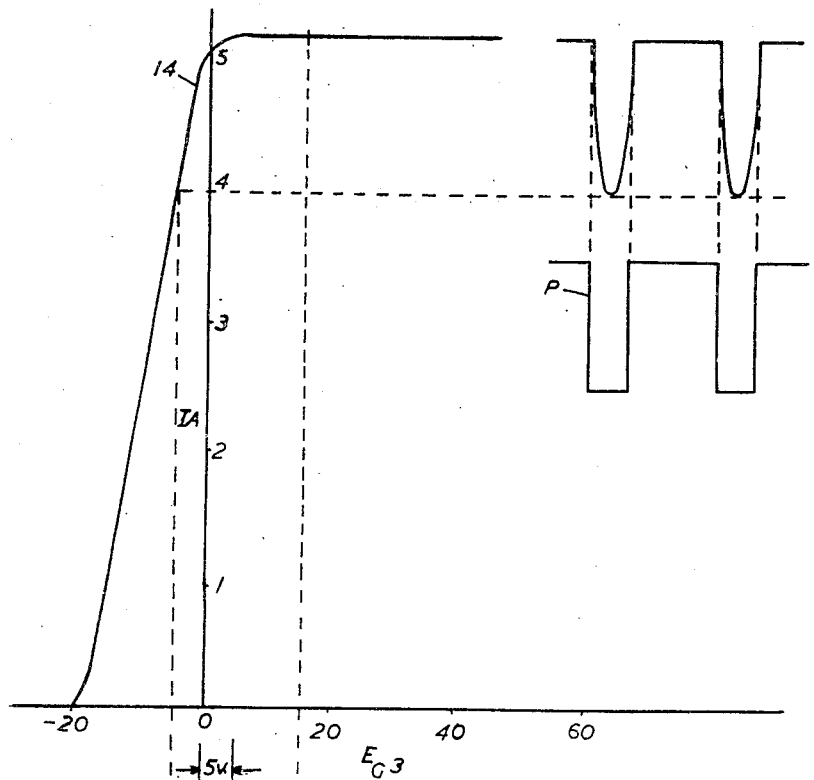
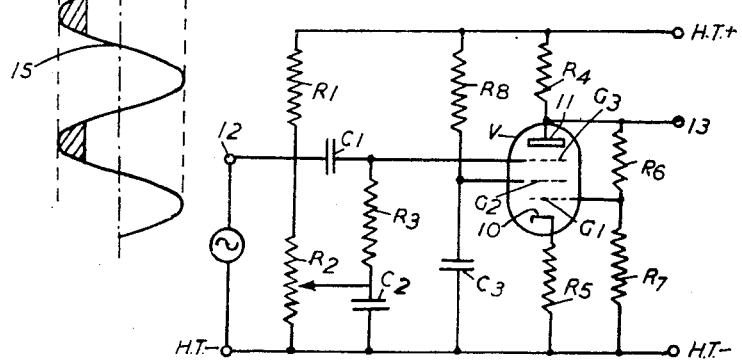
Inventor
Thomas Edward Ivall.
By Robert Harding jr
Attorney Sept. 12, 1950 T. E. IVALL 2,521,726
ELECTRICAL CIRCUITS FOR THE GENERATION
OF PULSES OR OSCILLATIONS
Filed Oct. 17, 1944 2 Sheets-Sheet 2

Inventor
Thomas Edward Ivall
By
Robert Harding Jr
Attorney

Patented Sept. 12, 1950

2,521,726

UNITED STATES PATENT OFFICE 2,521,726

ELECTRICAL CIRCUITS FOR THE GENERATION OF PULSES OR OSCILLATIONS

Thomas Edward Ivall, Slough, England, assignor to Standard Telephones and Cables Limited, London, England, a British company, and Marconi's Wireless Telegraph Company Limited, London, England, a British company Application October 17, 1944, Serial No. 559,103
In Great Britain August 19, 1943

Section 1, Public Law 690, August 8, 1946
Patent expires August 19, 1963

2 Claims. (Cl. 250—27)

The object of this invention is to provide an electrical circuit which includes a valve and which is adapted, in one form, to generate a pulse when triggered with a suitable input signal, in another form, to serve as a generator of substantially sinusoidal oscillations, and in another to serve as a multivibrator controlled by a synchronising voltage injected at a suitable point in the circuit.

The improved circuit according to this invention includes a valve having, in addition to the cathode and the anode, at least three electrodes disposed one behind another in the cathode-anode path, the first and second of said electrodes (counting from the cathode end of said path) and said cathode being connected to operate as a cathode-follower system with said second electrode acting as an intermediate anode, and the third of said electrodes being connected as a control electrode adapted to be fed with the output of said cathode-follower system, and means for applying positive feedback from said anode to said cathode-follower system such as to give the circuit substantially infinite gain for a short period. Control means are preferably provided for varying the bias applied to said third electrode. Thus said third electrode may be connected to the tapping on a potentiometer connected across the source of anode current.

When the improved circuit is intended for use as a pulse-generator, the anode may be connected to the positive terminal of the source of anode current by a load resistance and to the negative terminal of said source (HT—) by a potential divider the tapping of which is connected to said first electrode, while said third electrode is connected to a source of variable bias potential and through a coupling condenser to HT—, and said second electrode is also connected through a coupling condenser to HT—; the input signal is applied between said third electrode and HT—, and the generated pulse appears across said potential divider. Thus the valve may be a pentode arranged to operate as two separate triodes in series.

Where the circuit is intended for use as an oscillator, said anode load resistance is replaced by a tuned oscillatory circuit, and the valve may have more than five electrodes, one of the additional electrodes serving as a shield between the first and third electrodes.

Where the circuit is intended for use as a multivibrator, the anode of said valve may be connected to the positive terminal of the source of anode current by a load resistance and to the negative terminal of said source by a potential divider the tapping of which is connected to said first electrode, while said third electrode is connected through a resistance to a source of variable bias potential and through a coupling condenser to said second electrode; the generated oscillations appear across the potential divider. Means may be provided for injecting a synchronising oscillation into the last-mentioned resistance.

Figure 4:
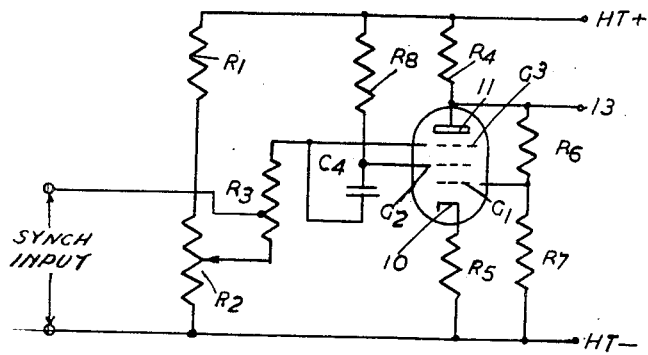

Three embodiments of the invention will be described by way of example with reference to the accompanying drawings, in which:

Fig. 1 is a circuit diagram of a pulse-generator.
Fig. 2 is a graph illustrating the operation of this circuit.
Fig. 3 is a circuit diagram of an oscillator, and
Fig. 4 is a circuit diagram of a multi-vibrator.

Referring to Fig. 1, a pentode valve V has a cathode 10, an anode 11, and three grids G1, G2 and G3. The cathode 10 is connected to HT— by a load resistance R5, and the anode 11 is connected to HT+ by a load resistance R4 and to HT— through a potential divider consisting of resistances R6 and R7 in series, the junction of these resistances being connected to the first grid G1. As will hereinafter become apparent, the purpose of the potential divider R6, R7 is to feed back from the anode to the grid G1 the voltage necessary to cause a cumulative action providing the said infinite gain. The grid G2 is connected to HT+ by a resistance R8 and to HT— by a condenser C3.

The input signal is applied between HT— and a terminal 12 which is connected to the grid G3 by a condenser C1. The grid G3 is biassed by a potentiometer R2 one end of which is connected directly to HT— and the other end of which is connected by a resistance R1 to HT+, the potentiometer tapping being connected to the grid G3 through a resistance R3 and to HT— by a coupling condenser C2. The output pulse appears at terminal 13.

The values of the components to be selected depend on the range of pulse-widths required, on the required amplitude of voltage, and on the shape of pulse desired. It may be necessary to effect a compromise between the first two of these requirements and the degree of sharpness of the pulses. For a particular application the following values of components have been found suitable, the valve V being a Mullard E. F. 50.

R1 = 100 k. ohms
R2 = 100 k. ohms
R3 = 100 k. ohms
R4 = 20 k. ohms
R5 = 5 k. ohms
R6 = 10 k. ohms
R7 = 100 k. ohms
R8 = 30 k. ohms
C1 = 0.1 μf.
C2 = 1 μf.
C3 = 8 μf.

While the input to the circuit may be of any wave form, for the sake of simplicity it will be assumed to be sinusoidal.

The effect of varying the potentiometer R2 from minimum to maximum will be to vary the bias on the grid G3 with respect to the cathode from a negative value, through zero to a positive value. This is because the potential difference developed across the resistance R5 by the valve current flowing through it will supply a negative bias to the grid G3 at the minimum setting of the potentiometer R2, will balance the potential drop across R2 at an intermediate setting and will be overcome at the maximum setting of R2, so resulting in a positive bias on the grid G3.

The valve is operated at a low voltage of about 150 on the anode and on the grid G2, and a typical characteristic, for this condition, of anode current $I_A$ in milliamps. to voltage on G3 in volts with respect to the cathode 10, when the cathode and the grid G1 are at the same potential, is given in Fig. 2.

If the valve is in a steady-state condition with a positive potential of say 40 volts above HT— on the grid G3 and with a potential difference of 20 volts across the cathode load resistance R5, the resultant bias applied to the grid G3 with respect to the cathode will be 20 volts positive. If a sine wave of a peak value of 10 volts is applied to the grid G3 through the condenser C1, it will fall on the horizontal part of the characteristic curve 14 and have no effect on the anode current.

If, however, the potential difference between the tapping of R2 and HT— is reduced to say 25 volts, the bias on the grid G3 will be only 5 volts positive, with the result that on the negative half cycles of the input sine wave 15 the grid G3 will suddenly swing negative with respect to the cathode to an instantaneous maximum value of 5 volts.

When the grid G3 receives this negative-going impulse, the electron flow from the cathode to the anode falls and less current flows in the anode load resistance R4, causing the voltage drop across it to decrease. Now the anode is at a higher positive potential and causes more current to flow in the potential divider R6 and R7, the result being that the potential difference across the resistance R7 increases. The resulting positive potential on the grid G1 causes an increased electron flow and the current in the cathode circuit increases, but now it tends to flow through the grid G2 and the resistance R8 instead of through the anode load resistance R4, because the interposed grid G3 has been driven slightly negative.

The potential difference so developed across the cathode load resistance R5 sends the cathode positive above earth to a value equal to the voltage on the grid G1, owing to the cathode-follower action. This has the effect of sending the grid G3 negative with respect to cathode. As the grid G3 is working on a negative-going impulse, it will thus be sent more negative still; the action round the loop consequently will be cumulative and take place instantaneously. The effect on the anode will be a sudden increase in voltage of the order of 40 volts, giving the first vertical edge of the pulse, which is shown at P in Fig. 2.

It is obvious that the two halves of the pentode are now in opposite conditions, the top half has a large negative bias on the grid G3 and is virtually cut off, whereas the bottom half is in a conducting condition. The principle of operation is to make the valve alternate between this and the steady-state condition, the transition taking place instantaneously.

The flat top of the square pulse will be reached when the potential on the grid G3 passes the cut-off point of curve 14, Fig. 2, which has been shown to occur for a value of —20 volts. The anode voltage applied to output terminal 13 will remain stationary even if the instantaneous negative voltage of the input sine-wave continues to increase. The next changeover will occur when the input signal reaches a value of sufficiently positive or low negative to overcome the additional bias resulting from the cathode-follower action so that the potential of G3 rises to a point on the sloping portion of characteristic curve 14. Now, a little current flows in the top half of the valve; the anode voltage falls owing to the increase in the potential difference across the anode load resistance R4 and the positive bias on the grid G1 decreases, thus allowing less current to flow in the cathode load resistance R5. The consequent drop in potential at the cathode is equivalent to applying a positive voltage to the grid G3, which, as before, causes a cumulative action to take place, and the anode voltage falls rapidly to its former value, giving the downward vertical edge of the pulse.

As the action depends upon a negative-going impulse, it is the positive bias applied to the grid G3 that controls what "level" of the instantaneous voltage of the input sine-wave shall actuate the circuit and therefore also controls the width of the pulses produced. So the pulse-width control is the potentiometer R2.

In this circuit, it so happens that the "elbow" of the characteristic curve 14 occurs at zero bias voltage, and, as this is the point from which the pulse action starts, for an optimum condition the cathode voltage must be somewhere near the voltage applied to the grid G3 from the potentiometer R2. To obtain pulses that vary in width from 0 to 360° of the cycle it is necessary to make the difference between these two voltages (or the bias on the grid G3) capable of being varied between positive and negative values that at least are equal to the peak voltage of the input sine-wave.

This pulse generator will give well-shaped pulses at frequencies from 0–5 kc./s. but from about 10 kc./s. upwards the pulses tend to lose their squareness because the rate of build-up of the vertical edge is slower in relation to the pulse width at high frequencies than at low ones. Valve capacity tends to by-pass the high-frequency components involved in a vertical edge, with a consequent deterioration in pulse shape.

The system of positive feedback employed in this circuit is suitable for maintaining oscillation, and the circuit may be used as an oscillator that will generate substantially sinusoidal oscillations at audio and radio frequencies, if an appropriate tuned circuit L. C. (Fig. 3) is substituted for the resistance R4 in the anode circuit of Fig. 1, the input signal being disconnected. The feed-back voltage may have to be adjusted in order to develop maximum power: this is best done by using say a 100,000 ohm variable resistor for R6, and then finding the best working condition by adjusting both R2 and R6. As the grids G1 and G3 do not work in phase, any internal coupling that might occur between them is undesirable, and better results may be obtained by using a heptode valve, the design of which provides for minimum capacity coupling between the two control grids.

The circuit of Fig. 3 may have the same component values as hereinbefore given for Fig. 1, except that R6 has a maximum value of 100 k. ohms instead of a fixed value of 10 k. ohms, the valve being an Osram X. 64.

The circuit may be adapted as in Fig. 4 for use as a multivibrator in order to produce continuous oscillations in the form of pulses. The adaptation consists in the removal of the condensers C2 and C3 (Fig. 1), and the connection of the condenser C4 (Fig. 4) between G2 and G3. The condenser C4 and the resistance R3 determine the time constant of the circuit.

If the resistance R8 is considered as an anode load, the resistance R3 as the grid leak of another valve and the whole, including the condenser C4, as an intervalve coupling, it will be seen that the variations in potential which occur at G2 will be conveyed directly to G3 by means of the condenser. An examination of the feedback system already described will show that when the condenser C3 (Fig. 1) is removed, any variation at G3, whether positive or negative, will appear at G2 in the same direction. Thus the variation conveyed back to G3 via the condenser C4 will augment the variation already there, i. e. that which started the action. In consequence, a cumulative action will take place, producing a vertical edge as in the pulse-generator already described. A limiting condition will be reached for the reasons explained before, and there will then be no further change. At this point the condenser C4, which has charged up to a voltage equal to the total variation at G2, will now start to discharge through the various paths of leakage, the main one being the resistance R3. When it has discharged sufficiently for the voltage conveyed to G3 to be again equal to that which started the action, another cumulative action will take place, this time in the reverse direction, giving the other edge of the pulse.

If the waveform conveyed to G3 is divided into positive and negative half-cycles by means of a datum line, and if the shape of each half-cycle can be imagined as a leading edge dying away in a condenser-discharge curve, then it will be readily understood that the leading edge of a positive half-cycle is started by the falling voltage (condenser-discharge) of a negative pulse.

As the phase relationships in this feed-back loop are such as are necessary to the maintenance of oscillation, it might appear that the normal path of feedback to G3 as used in the pulse-generator, i. e. through the variations across the cathode load R5, serves no useful purpose. The circuit will still function if the cathode load is removed altogether, but then the lower half of the pentode will no longer work as a cathode follower and there will be a very high positive voltage on G1 with respect to cathode, which will harm the valve. Therefore the cathode load is left in place, and in practice it will be found to augment the cumulative action.

The pulse-width control (potential divider R2) functions as in the pulse-generator, but now determines that voltage on the condenser discharge curve which will actuate the circuit.

It is necessary to preset the pulse-width ratio before attempting to vary the frequency of pulse oscillation, as the potential divider R2 is unavoidably a part of the time-constant circuit and will consequently shift the frequency at the same time as performing its own function. Once the pulse-width ratio is set, however, it will remain constant for any values of C4 and R3 and, consequently, over the whole frequency range.

Injection of the synchronising voltage required to control the frequency of the multivibrator is best done in the grid leak R3, because this is also a part of the time-constant circuit and consequently the injected voltage will here have a greater measure of control over the charge and discharge of the condenser. The resistance R3 may be tapped and the controlling voltage applied between the tap and HT— as shown in Fig. 4, or it may be regarded as the lower arm of a potential divider, in which case one terminal of the source of controlling voltage will be connected to HT— and the other to one end of a resistance, the other end of which is connected to G3, and the value of which is dependent on the degree of potential division required. Which of these two methods is employed is dependent on the impedance of the source of the controlling voltage and on the impedance into which the source is designed to work.

What is claimed is:

1. An electrical circuit for the generation of pulses, including a valve having a cathode, an anode and at least three electrodes disposed in the cathode-anode path, the electrode nearest the cathode, the intermediate electrode of said three electrodes, and said cathode being connected to operate as a cathode follower system with said intermediate electrode acting as an intermediate anode, and the electrode nearest the anode of said three electrodes being connected as a control electrode, the bias on said control electrode being determined at least in part by the operation of said cathode-follower system, a source of anode current, means for applying positive feedback from said anode to said cathode-follower system in a degree sufficient to give the circuit substantially infinite gain for a short time, said last means comprising a load resistance connecting said anode to the source of anode current and a voltage divider connected between said anode and the negative terminal of said anode source and having a tapping connected to said electrode nearest the cathode, a source of variable bias potential, a resistor connecting said electrode nearest the anode to said source of variable bias potential, a first coupling condenser connecting the junction of said resistor and said source of variable bias potential to the negative terminal of said anode source, a second coupling condenser connecting said intermediate electrode to the negative terminal of said anode source, means for applying an input signal between said electrode nearest the anode and the negative terminal of said anode source, and means for taking off the generated pulse across said potential divider, said valve thereby operating as two separate triodes in series.

2. An electrical circuit for the generation of pulses and oscillations, comprising a valve having a cathode, an anode and at least three grids including a first grid nearest the cathode, a second or intermediate grid and a third grid nearest the anode, a source of anode current for said valve, impedance means connecting said anode to the positive terminal of said source, a pair of resistors connected in series between the anode and the negative terminal of said source and having their common terminal connected to said first grid, a cathode resistor connecting said cathode to the negative terminal of said source so as to provide cathode-follower action maintaining the potential of the cathode substantialy equal to that of said first grid, a resistor connecting said intermediate grid to the positive terminal of said source whereby said intermediate grid acts as an auxiliary anode, all of said resistors and impedance means being selected so that the valve has a transconductance characteristic with respect to said third grid and the main anode which rises sharply from a cutoff point to a maximum value and remains substantially level at the latter value, a potentiometer connected between the positive and the negative terminal of said source, means including a resistor connecting the slider of said potentiometer to said third grid so as to apply thereto a variable biasing potential, and output means connected to the main anode.

THOMAS EDWARD IVALL.

REFERENCES CITED

The following references are of record in the file of this patent:

UNITED STATES PATENTS

| Number | Name | Date |
| --- | --- | --- |
| 1,844,950 | Finch | Feb. 16, 1932 |
| 2,060,095 | Mathes | Nov. 10, 1936 |
| 2,226,561 | Herold | Dec. 31, 1940 |
| 2,252,457 | Cockrell | Aug. 12, 1941 |
| 2,354,930 | Stratton | Aug. 1, 1944 |
| 2,396,083 | Crosby | Mar. 5, 1946 |